United States Patent
Albin et al.

[11] Patent Number: 6,144,699
[45] Date of Patent: Nov. 7, 2000

[54] DEVICE FOR ESTIMATING MOTION BY BLOCK MATCHING

[75] Inventors: François Albin, Champie, France; Michael Knee, Petersfield, United Kingdom

[73] Assignee: THOMSON multimedia S.A., Boulogne Cedex, France

[21] Appl. No.: 08/763,558

[22] Filed: Dec. 10, 1996

[30] Foreign Application Priority Data

Dec. 29, 1995 [FR] France .................................. 95 15747

[51] Int. Cl.$^7$ ...................................................... H04N 7/36
[52] U.S. Cl. ............................ 375/240; 348/413; 348/699
[58] Field of Search ............................ 375/240; 348/402, 348/413, 416, 699; H04N 7/36

[56] References Cited

U.S. PATENT DOCUMENTS

| | | | |
|---|---|---|---|
| 4,897,720 | 1/1990 | Wu et al. | 358/136 |
| 5,212,548 | 5/1993 | Haan et al. | 348/416 |
| 5,621,481 | 4/1997 | Yasuda et al. | 348/699 |
| 5,731,840 | 3/1998 | Kikuchi et al. | 348/416 |
| 5,825,423 | 10/1998 | Jung | 348/413 |
| 5,912,706 | 6/1999 | Kikuchi et al. | 348/401 |
| 6,025,881 | 2/2000 | Kikuchi et al. | 348/416 |

FOREIGN PATENT DOCUMENTS 0 626 791 11/1994 European Pat. Off. .
95/07591 3/1995 WIPO .

OTHER PUBLICATIONS

"Parallel Architectures for 3–Step Hierarchical Search Block–Matching Algorithm", IEEE Transactions on Circuits and Systems For Video Technology, Her–Ming Jong, et al., Aug. 1994, vol. 4, No. 4, pp. 407–415.
"A VLSI Motion Estimator for Video Image Compression", IEEE Transactions on Consumer Electronics, Chen–Mie Wu, et al., Nov. 1993, vol. 39, No. 4, pp. 837–846.
"A Motion Estimator for Low Bit–Rate Video Codec", IEEE Transactions on Consumer Electronics, Yen–Shen Jehng et al., May 1992, vol. 38, No. 2, pp. 60–69.

*Primary Examiner*—Howard Britton
*Attorney, Agent, or Firm*—Joseph S. Tripoli; Ronald H. Kurdyla; Alexander J. Burke

[57] ABSTRACT

A device for estimating motion between a current image and a previous image by block matching, the images being split into blocks. The device includes a processing circuit for each candidate motion vector and at least one memory. Each processing circuit calculates errors between a block of the current image and the block designated by a respective candidate motion vector in the previous image. The processing circuit successively receives pixels of the current image according to a line scan at a first input and corresponding pixels of the previous image identified by the associated candidate motion vector at a second input. The processing circuit calculates partial sums at the end of line of each block of the current image corresponding to accumulated errors for this block. The processing circuits further include an output for delivering the partial sums and a third input for receiving the partial sums. The output and third input of the processing circuit is coupled to the memory such that, when processing a block and line scanning, partial sums of the block preceding the processed block are transmitted from the output to the memory and partial sums of the block following the processed block are received from the memory at the third input.

6 Claims, 4 Drawing Sheets

FRAME 1 INPUT  FRAME 2 INPUT

☐ FRAME (OR IMAGE) DELAY

☐ LINE DELAY

☐ SAMPLE (OR PIXEL) DELAY

▨ PROCESSING CIRCUIT

DEVICE FOR ESTIMATING MOTION BY BLOCK MATCHING

The invention relates to a motion estimation device based on the block matching technique.

This technique is well known in the field of motion estimation in respect of television pictures. It consists in searching, starting from a current image block consisting of a set of pixels, for a block in the preceding image which best matches it according to certain criteria. These criteria are, for example, the absolute error or mean square error between the luminance values of the overlaid pixels, which error is summed over the set of pixels of the block.

This search is effected within a search window of the preceding image defined around the position of the current block.

The relative position of the two blocks gives the displacement, that is to say the value of the motion vector.

This technique based on the preceding image alone is known by the term "one-sided block matching". It can be extended, when interpolating images, to searching for blocks correlated with those, virtual, of this interpolated image, by performing this search over the preceding image and the following image. It is then known by the term "two-sided block matching", to be, for example, described in the European patent application No. 93 402 187.4 filed on Sep. 8, 1993 in the name of Thomson Consumer Electronics SA.

Two examples of motion estimator architecture known from the prior art and described in the abovementioned application are represented in FIGS. 1 and 2. The searches are made, in these examples, in windows of ±2 pixels horizontally and vertically around the current block.

FIG. 1 corresponds to "one-sided block matching". The processing circuits, hatched in the figures, receive in parallel on one input, the information relating to the current pixel (the luminance). The same type of information, but originating from the preceding image owing to the image (or frame) delay circuit, is presented on the second input of each processing circuit. The line and pixel (or sample) delay circuits which the luminance information has to cross before arriving at the second input of the processing circuit define the block matched with the current block and hence the motion vector associated with the processing circuit. This block corresponds to the current block shifted by successive delays horizontally (elementary delay) and vertically (line delay) which the luminance information crosses before reaching the relevant circuit. Each processing circuit relates to a particular shift and therefore to a candidate motion vector. The search window which is ±2 pixels horizontally and vertically around the current block corresponds to 25 candidate motion vectors.

Each processing circuit accumulates the errors between the luminance values for each of the pixels of the current block arriving at its input in such a way as to give the overall error between the current block and the block of the preceding image corresponding to the circuit. For this current block, the minimum accumulated error nominates the circuit, hence the block of the preceding image and hence the motion vector. This is carried out for each of the blocks of the image.

The calculated error can be the absolute error or the mean square error.

FIG. 2 corresponds to "two-sided block matching". Here the processing circuits accumulate the errors between the block of the following image and the block of the preceding image so as to determine the motion vector to be assigned to the current block of the interpolated image according to the principle set out in the previously mentioned patent application.

Such architectures, which exploit the video information according to the television scan, require storage circuits which are complex to implement; this storage of intermediate results, which is due to this type of scan and which allows the errors to be calculated for each block, must be performed at the level of each processing circuit and, for a given processing circuit, at the level of each block and even at the level of each line of each block. A solution consisting in scanning all the lines of a block before passing to the next block, and hence block after block, would generate equally complex scan conversion circuits.

The motion estimator and in particular the processing circuits generally have a different structure, depending on the number and the size of the block processed, precluding standardization or low-cost integration owing to this specificity.

The purpose of the present invention is to solve the problems posed.

Its subject is a device for estimating the motion of a video image by block matching, comprising a processing circuit for each candidate motion vector, so as to calculate the errors between the pixels matched by this vector for each block of the image. The processing circuits aggregate the errors at each line of a block so as to deliver partial sums, and the processing circuits relating to the candidate motion vectors of like component are coupled together to form a chain, itself looped back by way of a memory so as to transfer the partial sums of the errors calculated in the current video line for the preceding block and corresponding to each of these candidate vectors to this memory and the partial sums calculated in the preceding video line and relating to the next block, from this memory to the inputs of the corresponding processing circuits, these transfers being carried out while calculating the partial sum of the current block.

By virtue of this device, the circuits for implementing the estimator are simplified, and the calculation time and cost of the latter are reduced. No scan conversion is required. The memory circuits are of restricted number allowing a simplification of the overall architecture of the motion estimator. This architecture is adapted to various types of matching, for example over the preceding image of the "one-sided block matching" type or interpolative of the "two-sided block matching" type. It is also adapted to the exploitation of blocks of variable size and provides easy access to the calculated errors for the blocks for downstream processing. The exploitation of small repetitive elementary structures coupled together and to common circuits is particularly well adapted to large-scale integration, for example the production of VLSI (Very Large Scale Integration) circuits.

The characteristics and advantages of the present invention will emerge better from the following description, given by way of example and with reference to the appended figures in which.

Figure 3:
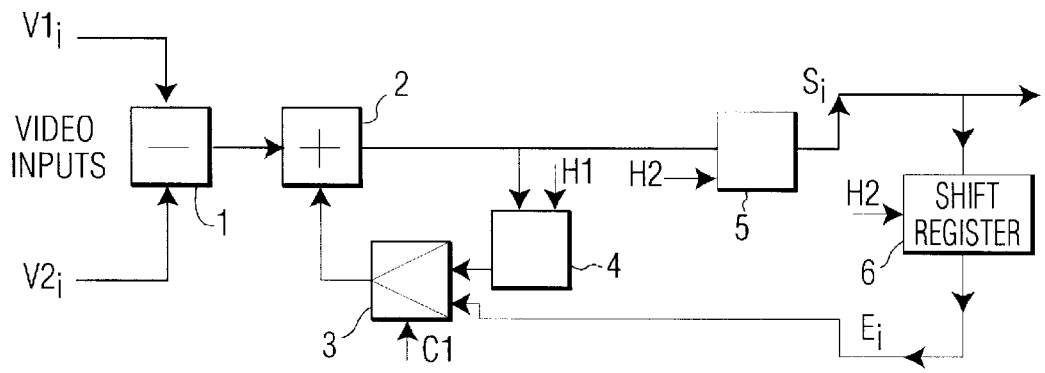
FIG. 3 represents a processing circuit of the motion estimator looped back to a shift register.

A first architecture of the processing circuit proper is represented in FIG. 3.

The information input to the circuit corresponds to a television scan. The image is decomposed in a known manner into blocks, a line of M blocks, in an image, constituting a band or "stripe".

Figure 1:
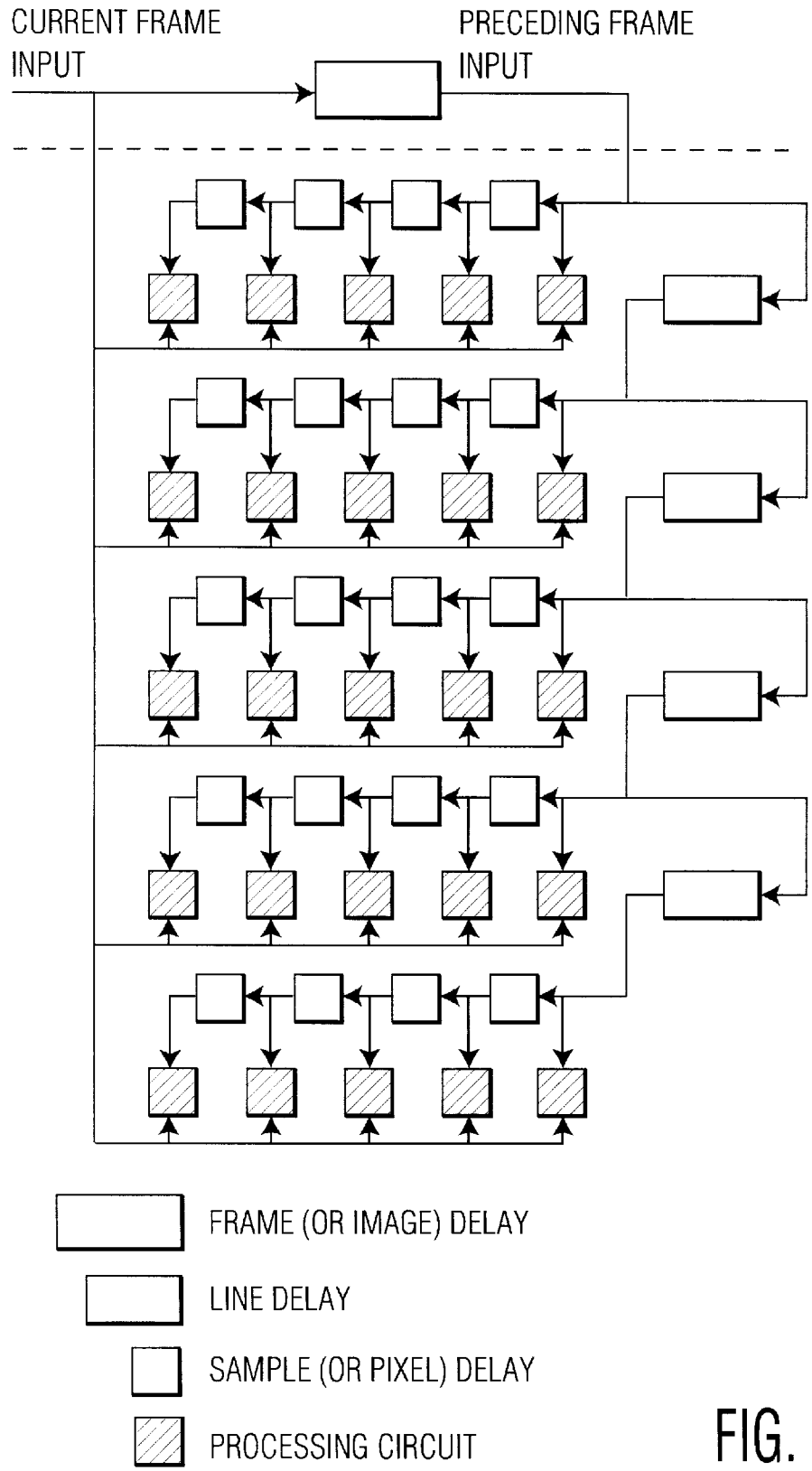
FIG. 1 represents an architecture of a motion estimator of "one-sided block matching" type according to the prior art.
Figure 2:
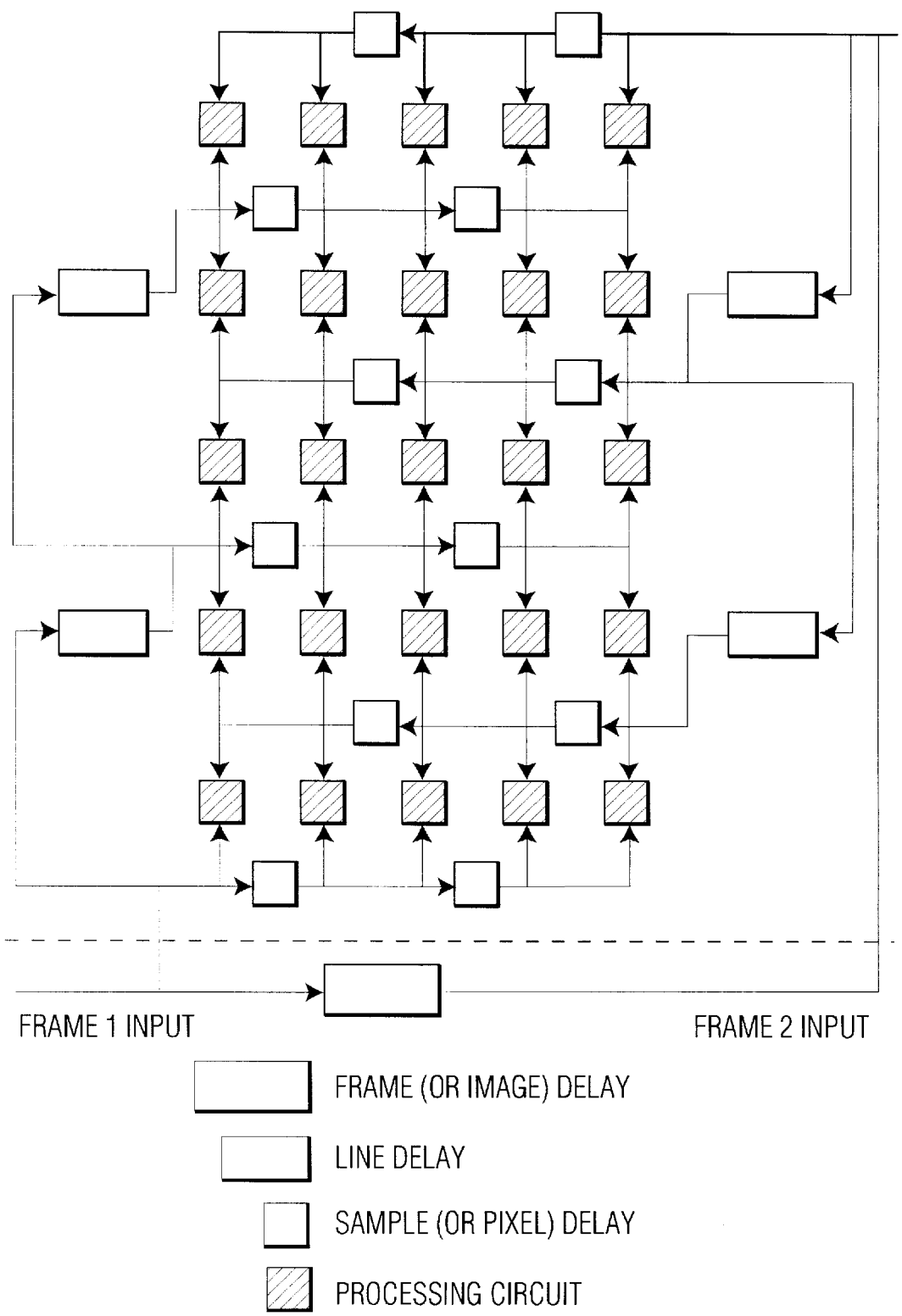
FIG. 2 represents an architecture of a motion estimator of "two-sided block matching" type according to the prior art.

A circuit for calculating the absolute error of the square error 1 receives, on a first input V1i, the luminance of the current pixel of the current block and, on the second input V2i, the luminance of the pixel, shifted in relation to the relevant processing circuit 1, of the preceding image. This shift is in fact, as we have seen in FIG. 1 and 2, dependent on the processing circuit studied, being related to the delay circuits which are associated therewith and which have to be "crossed" by the pixel of the preceding image or indeed the pixel of the preceding image and the pixel of the following image before arriving at the processing circuit. These numerical luminance values are received at the image sampling frequency or pixel frequency. The output of the calculating circuit is connected to a first input of an adder 2 whose second input originates from a multiplexor 3. The output of the adder is transmitted to a delay circuit 4 or memory register controlled by the pixel sampling clock, which clock is received on the clock input H1, and whose delay corresponds consequently to the duration between two samples. Its output is connected to a first input of the multiplexor 3. Thus, when the output of the latter is switched onto this input connected to the delay circuit, by way of a control signal transmitted to a control input C1 of the multiplexor, the adder 2 will add the previously aggregated and stored error arriving on its second input to the current error arriving on its first input. It will thus aggregate, in tempo with the pixel clock, the errors calculated by the calculating circuit 1 for the set of samples (pixels) received and will do so for as long as the multiplexor is set thus. The output of the adder 2 is also connected to the input of a second memory register 5 of the same type as the preceding one but here controlled by a clock input H2. The output of the register is the output labelled Si of the processing circuit and is connected to the input of a shift register 6. The output of this shift register is connected to the second input of the multiplexor 3, also the input labelled Ei of the processing circuit. The inputs and outputs Ei and Si are those of the processing circuit proper, the shift register not forming part of this circuit.

Switching C1 is effected in tempo with the line block clock whose frequency, referred to hereinafter as the line block frequency, is P times lower than the pixel frequency if P is the number of pixels in a line of a block. When passing to the pixels of the following block, the multiplexor is switched, for one pixel clock beat, onto the input Ei. This input Ei is equal to zero for the first line of a block and to the partial sum of this block for the other lines, this partial sum corresponding to the sum of the errors aggregated over each line of this block up to the current line. The value Ei is added, by way of the adder 2, to the error calculated in respect of the first pixel of the processed line of the clock. The sum is recorded in the register 4 at the following pixel clock beat corresponding to the appearance of the following sample on the inputs V1i and V2i and is transmitted to the input of the adder 2, the multiplexor 3 being switched again, during this same pixel clock beat, onto the output of the memory register 4. The errors are aggregated thus for each of the samples of a line of a block, passage to the following block triggering the switching of the multiplexor onto Ei. The input H2 receives the line block clock and stores the partial sum delivered by the adder in the register 5 at the end of a line of a block. The output Si is recorded at the following beat of the line block clock in the shift register 6 consisting of M−1 bins. This register therefore gathers in the partial errors at the line block frequency. The partial sum stored by the register 5 therefore appears M line block clock beats later at the output of the shift register 6 and hence on the second input of the multiplexor 3. This register plays the role, associated with the delay circuit 5, of a delay circuit with a delay of one line period, making it possible to input to the adder, when processing a new line of a block, the partial sum corresponding to the preceding line of this block. The output Si is also transmitted to buffer memories which will pick up only the values Si corresponding to the error aggregated over the whole block and will do so for each of the blocks of the image.

The previously described processing circuit is repeated as many times as there are candidate motion vectors, the complexity of the overall circuit being proportional to the dimension of the search window.

Figure 4:
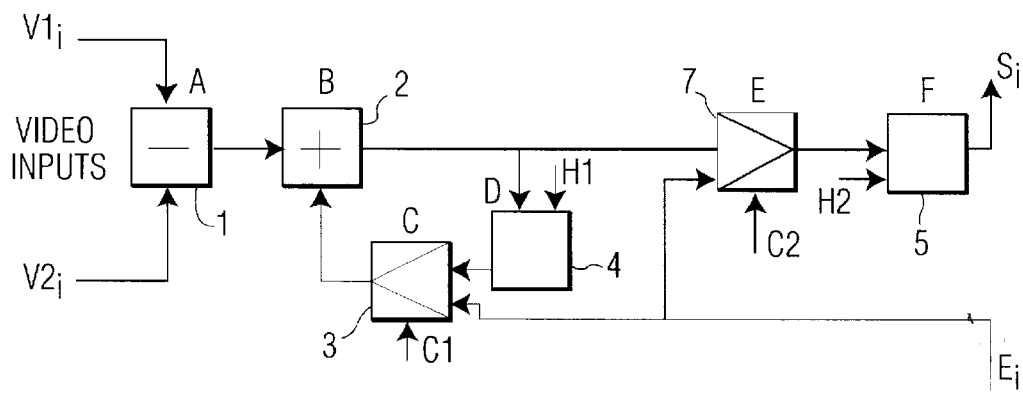
FIG. 4 represents another version of the processing circuit of the motion estimator.
Figure 5:
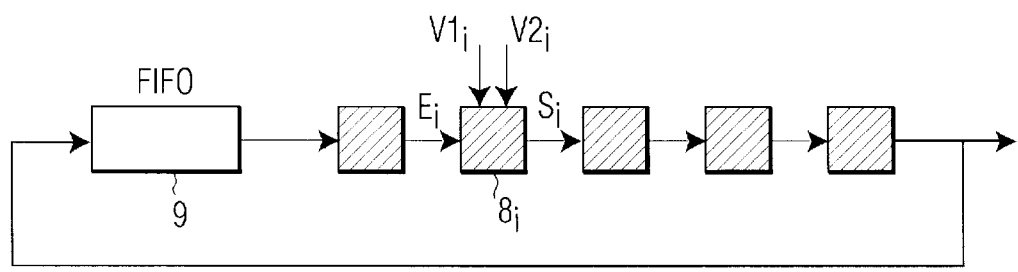
FIG. 5 represents a group of processing circuits.

A second embodiment of the device is represented in FIG. 4 and 5 and makes it possible to obtain a greater simplicity of the overall circuit.

FIG. 4 represents the processing circuit proper with its input and output Ei and Si. The elements which are common to the circuit of FIG. 3 are not described again and the same numbering is adopted.

The aggregated error, available at the output of the adder 2, is here transmitted to the shift register 5 by way of the multiplexor 7 whose role is made explicit further below. The output of the adder 2 is thus connected to a first input of a second multiplexor 7 whose switching is controlled by a signal transmitted to its control input C2 and the output thereof is connected to the input of the shift register 5 controlled by the clock input H2. The input Si of the processing circuit is connected to the second input of the first multiplexor 3 and also to the second input of the second multiplexor 7.

FIG. 5 shows a circuit for calculating the blockwise aggregated errors for the set of candidate motion vectors having like horizontal component. Five sets of this type or groups of processing circuits are therefore required to perform the matching processing operations according to the examples given in FIGS. 1 and 2.

The number N of processing circuits connected in cascade corresponds to the largest possible horizontal component of a motion vector (in number of pixels), also 5 in our example. Each of these circuits 8i which are the previously described processing circuits receives the video inputs V1i and V2i corresponding to the luminances. The output Si of each circuit is connected to the input E1+1 of the following circuit, Ei and Si being the inputs and the outputs described in FIG. 4. The output Si of the last circuit 8i, referred to as the output of the processing group, is connected to the input of an FIFO memory 9 and the output of this memory is connected to the input of the first circuit 8 of the chain.

Rather than accumulating the partial sums in shift registers of the above type for each of the processing circuits, these sums, available at the output of these processing circuits 8i after the processing of a line of a given block, will be transferred into a single FIFO memory 9 during the time of calculation of the partial sum of the following block. This memory makes it possible temporarily to store the partial sums effected at each line of each block and therefore for the set of processing circuits 8i.

It is the role of the multiplexor 7 to convey these measured partial sums to a single FIFO memory. Thus, the switching of the multiplexor 7 is carried out at the line block frequency, as for the multiplexor 3. Here, however, the input Ei is transmitted continuously, via the multiplexor, to the memory register 5, except for the period of the pixel clock corresponding to the last pixel of the block and during which the multiplexor is switched onto the output of the adder so as to transmit the partial sum to the memory register 5, the latter storing it by way of H2.

When the multiplexor is switched onto Ei, these partial sums stored in each memory register 5 are shifted from a memory register of one processing circuit to the memory register of the next processing circuit at the rate of the signal received on H2, for example the pixel frequency, and are recorded in the FIFO memory at this same rate.

Accumulated in the FIFO memory are N partial sums for each of the blocks processed, i.e. for the stripe Nx(M−1) values corresponding to M−1 blocks, the last N values calculated being stored in the memory registers 5.

Thus, when processing a line of a new block, the partial sums previously stored for this new block and for each of the processing circuits are transferred to the respective inputs of these circuits at the same time as the partial sums calculated for the preceding block by each of the processing circuits are transferred to the FIFO memory, this being done by using the serializing of the memory registers 5 when the multiplexor 7 is linked to the input Ei. These registers then play the role of shift circuits with N bins. Transfer is effected at the pixel clock frequency received on H2, while calculating the partial sum of a line of a block. The FIFO memory can be a simple shift register having N(M−1) memory bins for example when the tempo of the inputs/outputs is the same.

While processing the last line of a stripe, the "partial sums" travelling through the memory register 5 of the last processing circuit of the cascade are in fact the final errors of each of the motion vectors of a block (or each of the processing circuits of the chain), and this is so for each of the blocks of the stripe. These values available at the output of the processing group are the ones which are taken into account by the circuits downstream of the motion estimator.

If the total number of candidate motion vectors and therefore of processing circuits is less than or equal to the number of pixels in a line of a block, then all the partial suns can be transferred at pixel clock frequency within the duration of processing of a block. Provided that the instant of transfer is shifted by N times the pixel period from one group to another, the final errors output by the last memory register 5, for a given block, can then be transmitted sequentially, for example by multiplexing the outputs of each of the processing groups corresponding to a vertical component of a motion vector, this being within a line block period (corresponding to P pixel periods).

Figure 6:
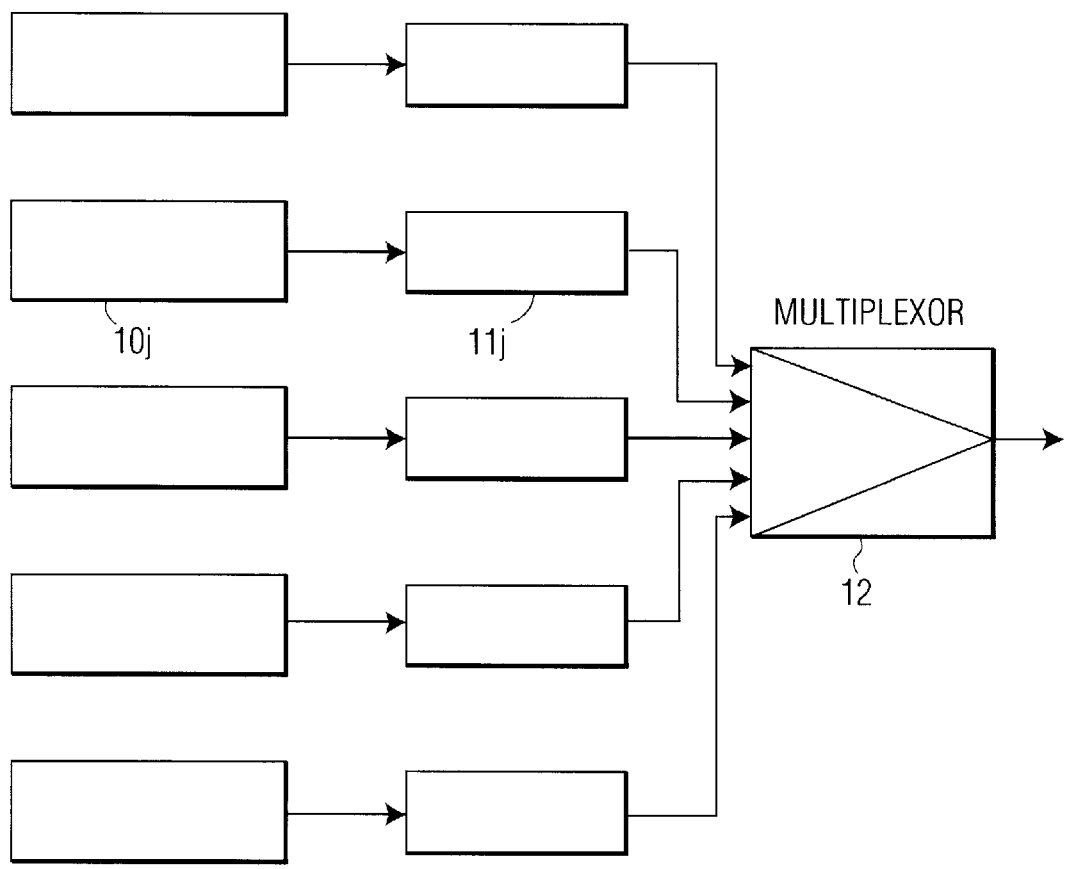
FIG. 6 represents the layout of the groups of processing circuits of the motion estimator.

If the number of pixels in a line of a block is less than the total number of processing circuits while being greater than the number of processing circuits of a processing group, a buffer memory is used at the output of each processing group as represented in FIG. 6. This is a circuit for collecting and serializing the measured errors for each block of the image.

The circuit 10*j* corresponds to the previously described circuit in FIG. 5 also referred to as a processing group. The output of this circuit 10*j*, which concerns a group j of motion vectors having the same horizontal amplitude, is therefore the output of the last processing circuit 8*i* in the cascade.

This output is connected to the input of a buffer memory circuit 11*j* which will store the errors relating to each of the blocks of the image for the motion vectors corresponding to the circuit 10*j*, the transfer clock being the pixel clock used also for the transfer of these errors to the FIFO memory. The capacity of a buffer 11*j* is equal to the number of processing circuits 8 of the processing group connected to this buffer, multiplied by the number of blocks in a stripe.

Finally, if the number of pixels in a line of a block is less than the number of processing circuits of a processing group, the frequency of transfer of the partial sums to the FIFO and of the blockwise errors to the buffer memory must be greater than the pixel frequency.

A simple embodiment will however consist in the number of processing circuits per group corresponding to the number of pixels per line of a block.

In our example j is equal to 5, this corresponding to the window of ±2 in the vertical direction, and the number of pixels in a line of a block is assumed at least equal to 5 and less than 25. The calculated errors are then transmitted simultaneously for each of the groups by way of the corresponding buffer memories 11*j*. This transfer is effected while scanning the last line of each stripe. On its 5 inputs a multiplexor 12 receives the output from the buffer memories. Each memory output is successively output by the device, by way of the multiplexor, so as to deliver the error corresponding to one and the same block and so on for each of the blocks, this being at a buffer memory reading rate equal to the pixel frequency. All the errors corresponding to the candidate motion vectors for a given image block are therefore transmitted serially at the output of the multiplexor, from the first to the last block of the image.

The serial transmission of the errors of a block which are related to each motion vector can be performed throughout the duration of a stripe period divided by the number of blocks of which it is composed, that is to say the duration of a line block period multiplied by the number of lines of a block, this corresponding to a maximum number of motion vectors equal to the number of pixels of a block, if transmission is carried out at the pixel frequency. The number of candidate motion vectors must therefore be at most equal to the total number of pixels in a block for transmission at the sampling frequency.

In the contrary case, the frequency of reading the buffer registers 11 must be greater than the pixel frequency.

A particular embodiment relates to blocks of 16 pixels horizontally and 8 vertically. The search window is ±2 pixels vertically and +7, −8 pixels horizontally. The number of motion vectors or processing circuits is therefore 80, distributed into 5 processing groups each comprising 16 processing circuits. The errors measured for a stripe correspond to 80 values multiplied by the number of blocks in the stripe. These values are transmitted serially by the multiplexor 12, at the pixel frequency, over a period of 5 lines of the stripe, leaving the duration of the other 3 lines of this stripe transmission-free while the calculation of the errors of the current stripe is completed.

The embodiment described is of course in no way limiting. Thus, it is also entirely conceivable to couple the processing circuits in the vertical rather than horizontal direction. It will be possible to choose the type of coupling compatible with transfers at the pixel frequency.

It is also conceivable to use a single memory 9 for the whole set of processing circuits of the motion estimator rather then for each group of processing circuits. The outputs of the processing groups can then be multiplexed onto the FIFO input for example by way of three-state circuits or else be transmitted to the inputs which are then of sufficient number.

What is claimed is:

1. A device for estimating motion between a current image and a previous image by block matching, the images being split into blocks, said device comprising:
   a processing circuit for a candidate motion vector, said processing circuit calculating errors between a block of the current image and a block designated by the candidate motion vector in the previous image, said processing circuit including a first input for successively receiving pixels of the current image being received according to a line scan and a second input for successively receiving corresponding pixels of the previous image identified by means of the associated candidate motion vector; and at least one memory device, wherein said processing circuit calculates partial sums at an end of a line of each block of the current image, said calculated partial sums corresponding to cumulated errors for its respective block, said processing circuit further including a third input; and an output, said output providing said partial sums to said third input, said output and third input being coupled to said at least one memory such that when processing a current block and considering line scanning, partial sums of the block preceding the current block are transmitted to said at least one memory and partial sums of the block following said current block are retrieved from said at least one memory.

2. Device according to claim 1, wherein motion estimation is performed in accordance with "one-sided block matching".

3. Device according to claim 1, wherein motion estimation is performed in accordance with "two-sided block matching".

4. Device according to claim 1, further comprising a plurality of processing circuits, each of said processing circuits for processing a candidate motion vector, wherein said processing circuit for each candidate motion vector are connected in a cascade configuration to one another to form a chain for transferring said partial sums therethrough.

5. Device according to claim 4, wherein transfer of said partial sums occurs at a video sampling frequency.

6. Device according to claim 4, further comprising a buffer connected at the output of said chain of processing circuits for storing an output of said chain; and a multiplexer connected to an output of the buffers for serially transmitting the output to each processing circuit in said chain.

* * * * *